(12) United States Patent
Abe et al.

(10) Patent No.: US 8,641,117 B2
(45) Date of Patent: Feb. 4, 2014

(54) ASSIST GRIP FOR VEHICLE

(75) Inventors: Jun Abe, Tochigi-ken (JP); Hideki Oino, Niiza (JP)

(73) Assignee: Honda Access Corp., Niiza-shi (JP)

( * ) Notice: Subject to any disclaimer, the term of this patent is extended or adjusted under 35 U.S.C. 154(b) by 51 days.

(21) Appl. No.: 13/408,326

(22) Filed: Feb. 29, 2012

(65) Prior Publication Data

US 2013/0026776 A1 Jan. 31, 2013

(30) Foreign Application Priority Data

Jul. 25, 2011 (JP) ................................. 2011-162585

(51) Int. Cl.
*B60N 3/02* (2006.01)
(52) U.S. Cl.
USPC ........................................................ 296/1.02
(58) Field of Classification Search
USPC ................. 296/1.02, 1.01, 146.9, 71; 49/460; 16/110.1, 429
See application file for complete search history.

(56) References Cited

U.S. PATENT DOCUMENTS

| | | | | |
|---|---|---|---|---|
| 6,371,549 B2* | 4/2002 | Kim | ............................ | 296/146.8 |
| 6,574,921 B2* | 6/2003 | Zimmermann | ................. | 49/324 |
| 7,194,840 B2* | 3/2007 | Zimmermann | ................. | 49/324 |
| 7,744,141 B2* | 6/2010 | Saionji et al. | ................. | 296/1.02 |
| 8,056,188 B2* | 11/2011 | Villeminey | ..................... | 16/426 |
| 8,196,692 B2* | 6/2012 | Davis et al. | ................. | 180/89.1 |
| 2004/0036305 A1* | 2/2004 | Smith et al. | ................. | 296/1.02 |

FOREIGN PATENT DOCUMENTS

| | | | |
|---|---|---|---|
| JP | 11334446 A | * | 12/1999 |
| JP | 11334447 A | * | 12/1999 |
| JP | 2000-052834 A | | 2/2000 |
| JP | 2002-154364 A | | 5/2002 |
| JP | 2010-202120 A | | 9/2010 |

* cited by examiner

*Primary Examiner* — Hilary Gutman
(74) *Attorney, Agent, or Firm* — Westerman, Hattori, Daniels & Adrian, LLP

(57) ABSTRACT

There is provided an assist grip for a vehicle capable of gripping a grip main body easily when in use and applying force thereon and facilitating movement of getting off. The assist grip 1 for the vehicle includes the grip main body 2 for supporting getting out movement from the seat 51 of the occupant, which is provided in the lower part of the door opening 10 beside the seat 51, where the grip main body 2 is provided in a manner capable of raising and lowering in an outward direction of the vehicle. Accordingly, since the grip main body 2 falls outward of the vehicle at the time of use of the assist grip 1, a portion to which a hand of the occupant is applied becomes large, and a flexibility of posture change increases, and getting out of the occupant becomes easy.

20 Claims, 9 Drawing Sheets

ASSIST GRIP FOR VEHICLE

BACKGROUND OF THE INVENTION

1. Field of the Invention

The present invention relates to an assist grip for a vehicle for reducing a physical burden of an occupant at the time of getting out of a vehicle.

2. Description of Related Art

Conventionally, there has been proposed an assist grip for use in getting out of a vehicle, in which a nearly L-shaped assist grip main body is pivotally and retractably attached to a recessed part formed in a certain place of a rocker panel positioned on the side of a seat back of a seat, said assist grip main body being loaded with a coil spring so that it may be biased toward a stored position when not in use, but may be raised up to a upright position when in use (e.g., Japanese Unexamined Patent Application Publication No. 2000-052834).

According to the conventional art, an occupant, after having opened a door at the time of getting out of a vehicle, uses a finger hook part formed in the assist grip main body to bring the grip main body into an upstanding state against a restoring force of the spring. At that time, the occupant is allowed to get off safely since the grip main body is locked due to an engagement concave portion of the rocker panel being provided in a manner engageable with a projection of the assist grip main body, thus providing a sense of reassurance when operating the assist grip.

Also, there is disclosed a support apparatus for supporting an occupant when he/she gets in or out of a vehicle (e.g., Japanese Unexamined Patent Application Publication No. 2010-202120), in which a seat of the occupant is provided, at a side thereof, with a casing that is open at both a lateral side and a top side of the seat, such that a support member serving as a gripper is installed in a manner upstanding inside the casing, and the occupant is free to perform the ascending operation of the support member while the descending operation thereof is able to be locked at a predetermined position by using a one-way lock means, thus enabling the occupant seated on the seat to perform ascending and descending operations of the support member safely and easily.

According to these conventional assist or support apparatus, however, since the occupant needs to allow the assist grip main body to be raised from a stored position up to an upright position, or otherwise, the occupant needs to perform height adjustment of the gripper by him/herself according to his/her own physique, every time he/she uses it, and hence, there arise burdens for children, elderly people, etc at the time of use.

Moreover, since the conventional assist or support apparatus has a support or gripping part on the top of the rocker panel or the end of the main body of the seat in a vehicle, there is a problem that a position onto which the occupant's weight is shifted at the time of getting out of the vehicle is restricted to the neighborhood of the seat.

SUMMARY OF THE INVENTION

In view of the above problems, it is an object of the present invention to provide an assist grip for a vehicle enabling a grip main body to be gripped easily when in use so that an occupant can easily shift his/her weight thereon to get out of a vehicle.

In order to achieve the above object, a first aspect of the present invention is the assist grip for a vehicle including the grip main body for supporting an occupant getting out of a seat of in the vehicle, the grip main body being provided in a lower part of an door opening beside the seat in a manner capable of being raised and lowered in the outward direction of the vehicle.

According to a second aspect of the present invention, the grip main body turns into a projected state or a stored state according to opening or closing operation of the door of the vehicle.

According to a third aspect of the present invention, with a position of the seat being adjustable in a front-back direction, the grip main body is located in the side part of the seating portion of the seat over an entire range of the adjustable position of the seat.

According to the assist grip for the vehicle described in the first aspect of the present invention, the grip main body is provided in a manner capable of being raised and lowered in the outward direction of the vehicle, and thus, the grip main body is allowed to fall outward of the vehicle at the time of using the assist grip. Accordingly, a gripping portion where an occupant can put his/her hand becomes larger, while the occupant can enjoy an increased flexibility in changing his/her posture, thus making it easier for the occupant to get out of the vehicle.

According to the assist grip for the vehicle described in the second aspect of the present invention, when the door of the vehicle is in a closed state, the grip main body remains in a stored state, while when the door is in an opened state, the grip main body is allowed to turn into a usage state, i.e., a projected state in the outward direction, thus improving the convenience in using the grip main body. Moreover, since the position and direction of the end of the grip main body are determined by opening or closing the door, the occupant can save the trouble of doing troublesome operations, such as storing operation, raising operation, and position adjustment of the grip main body.

According to the assist grip for a vehicle described in the third aspect of the present invention, the grip main body is located in the side part of the seat without depending on the position of the seat, whereby the occupant can grip the grip main body firmly in any seating position. Accordingly, operability and convenience of the assist grip are improved.

DESCRIPTION OF PREFERRED EMBODIMENTS

Figure 1:
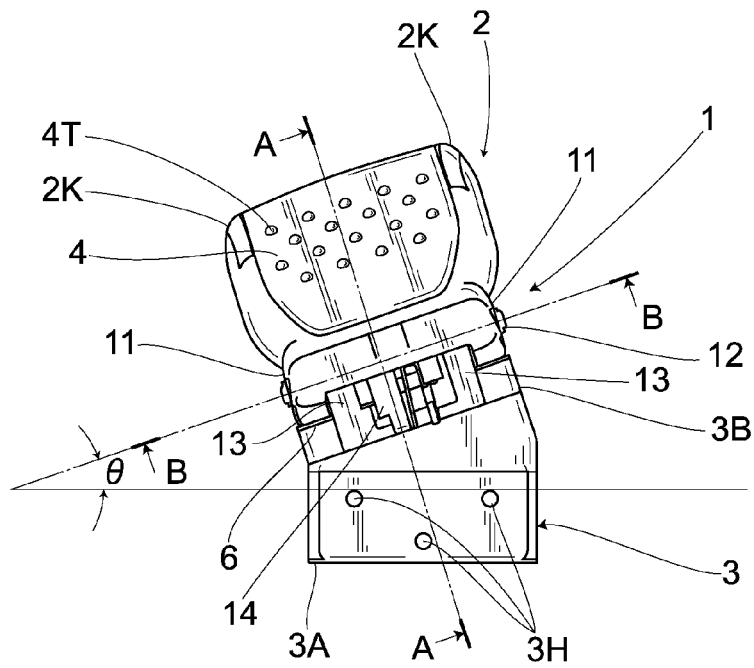
FIG. 1 is a side view seen from inside of a vehicle, showing a grip main body and a grip fixing base according to a first embodiment of the present invention.

Embodiments of an assist grip for a vehicle of the present invention are described hereunder with reference to the accompanying drawings.

First Embodiment

As shown in FIG. 1 to FIG. 12, an assist grip 1 for a vehicle according to the present embodiment the includes: a grip fixing base 3 attached to an appropriate part of an upper end of a side sill of a vehicle; and a grip main body 2 which can be gripped by one's hand at the time of using the same. The grip fixing base 3 has a plurality of attachment holes 3H each defining a tubular shape.

The grip fixing base 3 is inclined from its horizontal position located near the middle position with respect to its height direction, at an inclination angle θ as illustrated. Namely, while a lower part 3A thereof is vertically arranged, an upper part 3B thereof is inclined toward a front of the vehicle, and the grip main body 2 is attached to the upper part of the grip fixing base 3. This angle θ of inclination in the embodiment is an acute angle ranging from 15 to 25 degrees, which is set at 20 degrees in this embodiment. Thus, an occupant can grip the grip main body 2 easily at the time of getting in and out of the vehicle due to the upper part of the grip fixing base 3 tilted forward at the angle θ from the vertical direction, that is, due to the grip main body 2 inclined forward at the angle θ of inclination from the vertical direction. Note that the assist grip 1 is made of a molding material, such as polyurethane resin, ABS resin, and polypropylene.

Also, the grip fixing base 3 is firmly attached to a side sill 8 of the vehicle with a bracket 6, and is provided with a cover 7 which covers the grip fixing base 3 in an attached state and at least a part of the bracket 6. Here, the side sill 8 is located at the lower side of a door opening 10 provided on a side of the vehicle.

Figure 12:
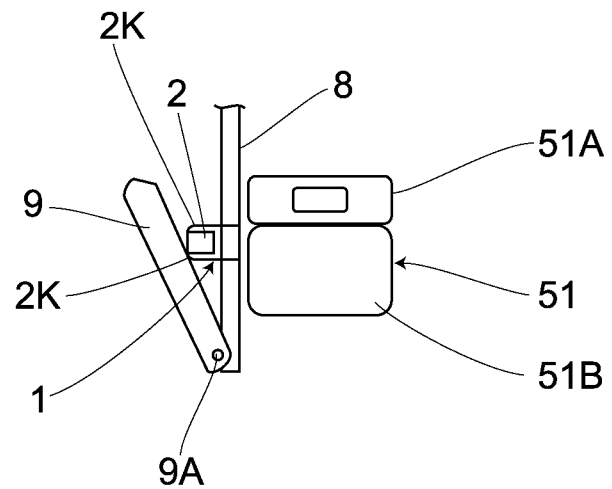
FIG. 12 is an explanatory plan view showing the attached assist grip according to the first embodiment of the present invention.

The grip main body 2 includes a grip rubber 4, acting as a nonslip member, attached to one side thereof. The grip rubber 4 includes a plurality of projections 4T, 4T, . . . . Moreover, the tip end of the grip main body 2 includes a convexly curved face 2A to facilitate smoothed engagement with the inside of the door 9 of the vehicle. Further, an upheaval part 5 including a convexly curved face 5A to engage with the inside surface of the door 9 near the storage position is provided at an opposite side below the curved face 2A. This curved face 5A is located at the tip side of the upheaval part 5, and is elongated in the front-back direction so that an occupant can grasp the curved face 5A better with his/her fingers being caught thereon easily. In the meantime, the grip rubber 4 and the upheaval part 5 are made of a synthetic rubber. The door 9 includes a hinge 9A in the front-back direction, and is of such a type that is opened and closed by rotating about the hinge 9A. The hinge 9A, in this embodiment, is provided at the front side of the door, as shown in FIG. 12.

The grip main body 2 can be lowered down to the outside of the vehicle from the substantially vertical position as the storage position, and can be raised back to the storage position from this lowered position. The grip main body has the grip rubber 4 arranged on the upper surface side, and the upheaval part 5 on the under surface side when it is used. The grip main body 2 has a substantially thick-plate shape which has a substantially rectangular shape in plan view, and the tip edges 2K, 2K of the grip main body 2 are formed into a convexly curved face 2K, respectively.

Figure 2:
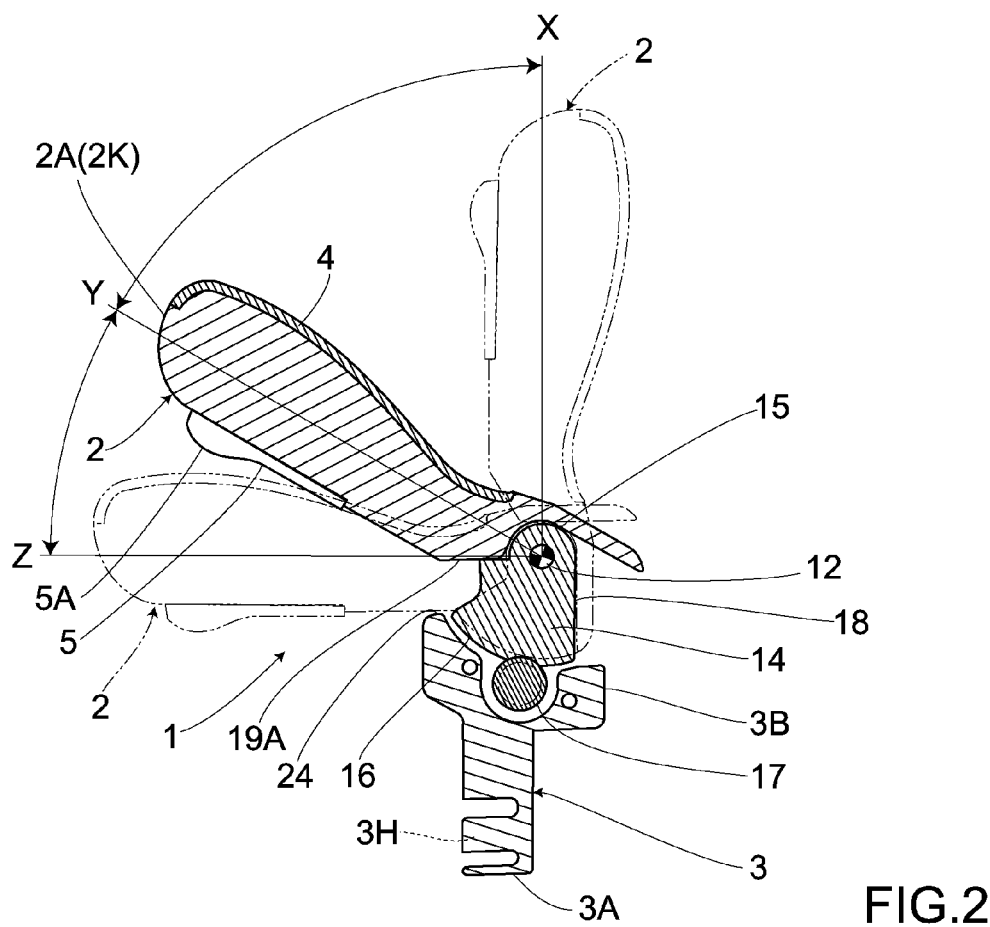
FIG. 2 is a sectional view on an A-A line of FIG. 1.

Specifically, as shown in FIG. 2, the grip main body 2 is provided in a manner rotatable in a range from the storage position X that is a substantially vertical position to the lower limit position Z that is a substantially horizontal position. The usage position Y, which is included within this rotatable range, is the one where the distal side of the grip main body 2 is slightly higher than the proximal side thereof, and has an angle approximately ranging 25 to 35 degrees against the horizontal direction, which is about 30 degrees in this embodiment. As described in detail later, the grip main body 2 is allowed to return to the storage position X from the usage position Y according to a closing movement of the door 9, specifically by being pressed by the inside surface of the door 9. On the other hand, the grip main body 2 is allowed to rotate to the usage position Y according to an opening movement of the door 9. In order to rotate the grip main body 2 to the usage position Y from the storage position X, there is employed a rotation biasing unit in this embodiment, such that the grip main body 2 is rotated in contact with the inside surface of the door 9 when opening or closing the door 9.

Figure 4:
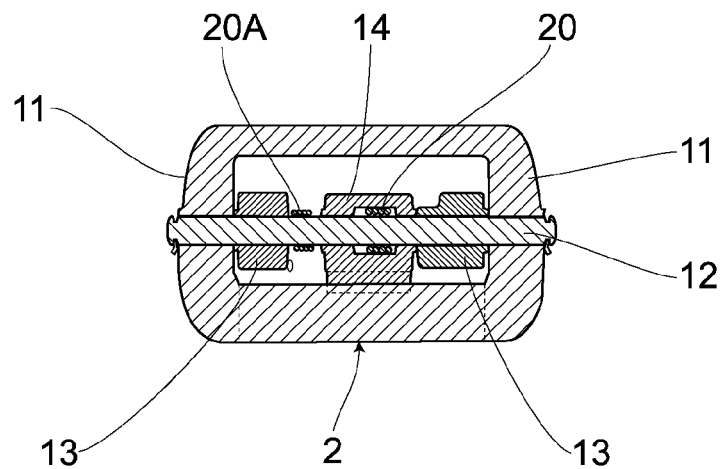
FIG. 4 is a sectional view on a B-B line of FIG. 1.

Next, a mechanism for raising and lowering the grip main body 2 will be described. Lower connection parts 11, 11 are provided at the front and rear sides of the lower part of the grip main body 2, and a metal connecting shaft 12 is provided therebetween. The metal connecting shaft 12 is obliquely provided so that the front side thereof is lower than the rear side thereof with the angle θ of gradient against the horizontal direction. On the other hand, upper connection parts 13, 13 are provided at the front and rear sides in the upper part 3B of the grip fixing base 3. As shown in FIGS. 1 and 4, these upper connection parts 13, 13 are connected with the metal connecting shaft 12 between the lower connection parts 11, 11 in a manner capable of rotating, whereby the grip main body 2 is provided in a manner capable of rotating around the connecting shaft 12.

Moreover, an intermediate rotating body 14 is provided in a manner capable of rotating around the connecting shaft 12 between the upper connection parts 13, 13. The intermediate rotating body 14 includes a substantially semicircular surface 15 in the upper part thereof, and a gear tooth 16 centering on the connecting shaft 12 in the lower part thereof. A braking gear 17 which meshes with the gear tooth 16 is rotatably provided in the upper part of the grip fixing base 3. The braking gear 17 is allowed to rotate with a certain braking force, so that the intermediate rotating body 14 is subjected to a predetermined braking force at the time of rotation by the braking gear 17.

Furthermore, an inside engaging surface 18 acting as an inside engaging stopper is provided at one side (an inside of the vehicle in an attached state) of the intermediate rotating body 14 following the semicircular surface 15, while an outside stepped portion 19 acting as an outside engaging stopper is provided at the other side of the intermediate rotating body 14 following the semicircular surface 15. Coil springs 20 and 20A each acting as a rotation biasing unit are provided on the connecting shaft 12, and both ends (not shown in the drawings) of the coil spring 20 are locked onto the grip fixing base 3 and the intermediate rotating body 14, respectively, so that the intermediate rotating body 14 is rotationally biased by the coil spring 20 toward the clockwise direction (toward the storage position) relative to the grip fixing base 3, as shown in FIG. 2. That is, the coil spring 20 acts as a torsion spring. Moreover, a stopper (not shown) for regulating the angular range of the intermediate rotating body 14 is provided in the upper part 3B of the grip fixing base 3 so that the stopper regulates the clockwise rotational range of the intermediate rotating body 14. In addition, the position shown with a solid line in FIG. 2 shows the initial position of the intermediate rotating body 14 that is in contact with the stopper, against which the intermediate rotating body 14 is pressed since the coil spring 20 is subjected to a torsion moment in the initial position.

Whereas, both ends (not shown) of the coil spring 20A, as another coil spring member, are locked onto the intermediate rotating body 14 and the grip main body 2, respectively so that the grip main body 2 is rotationally biased toward the counterclockwise direction (toward the lower limited position) relative to the intermediate rotating body 14 in FIG. 2.

Figure 3:
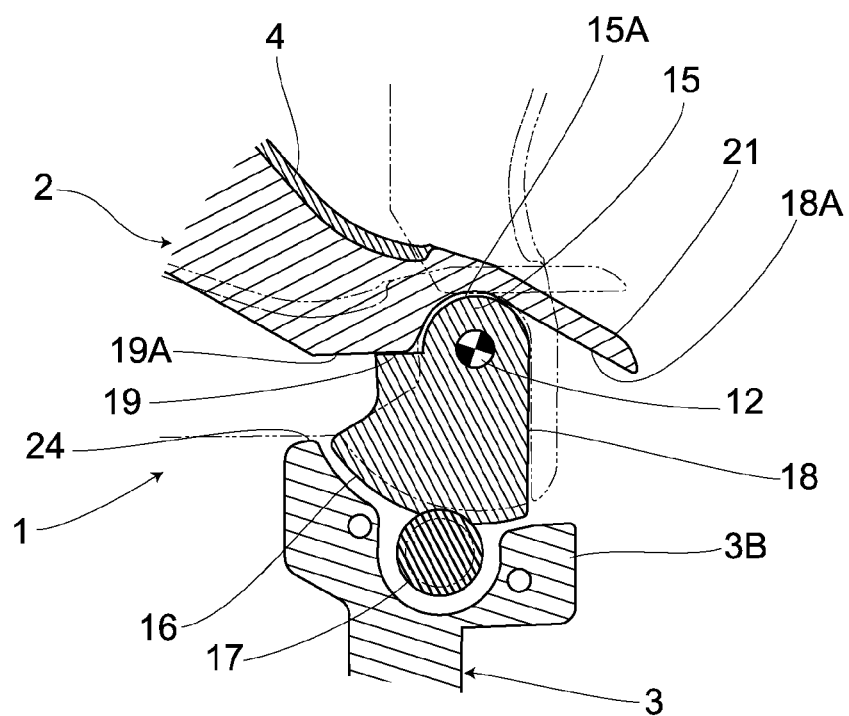
FIG. 3 is an enlarged section of a principal part, showing the first embodiment of the present invention.
Figure 5:
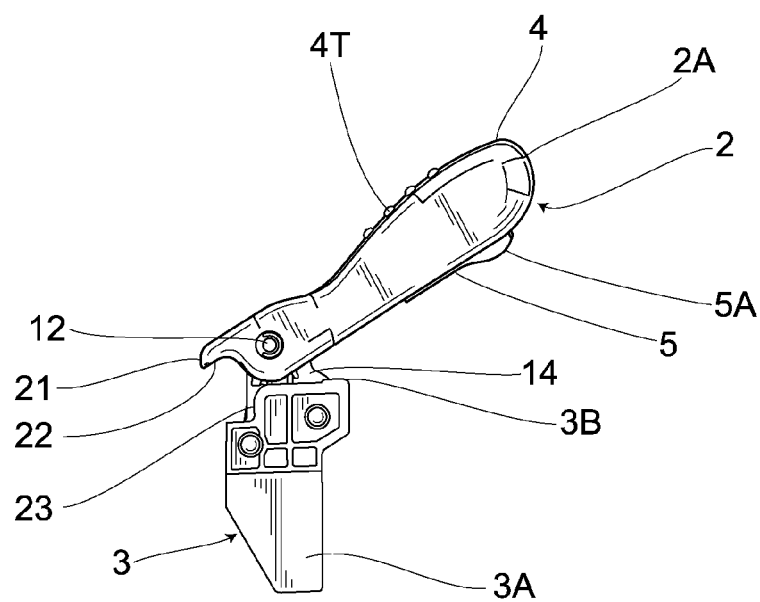
FIG. 5 is a rear view of the grip main body and the grip fixing base according to the first embodiment of the present invention.

Next is a description of an engagement position of the intermediate rotating body 14 and the grip fixing base 3 in the grip main body 2. As shown in FIG. 3 etc., the grip main body 2 is allowed to rotate toward the storage position X from the usage position Y by closing the door 9. A concave semicircular surface 15A is provided on the proximal side of the grip main body 2, corresponding to the semicircular surface 15 of the intermediate rotating body 14. Further, an extending part 21 is provided so as to extend downward from the concave semicircular surface 15A. The inner surface of the extending part 21 defines a central engaging part 18A which regulates the range of rotation of the grip main body 2 by contacting with the inside engaging surface 18. As shown in FIG. 5, engaging parts 22, 22 are provided at both sides of the extending part 21, and an engaging stopper 23 which contacts with these engaging parts 22 is provided at both sides of the upper part 3B of the grip fixing base 3. When the engaging stopper 23 is contacted by the engaging parts 22, the grip main body 2 is brought in a substantially vertical storage state. In this case, since the grip main body 2 is rotationally biased toward the usage position Y from the storage position X by the coil spring 20A, the curved face 5A of the grip main body 2 is in the state of being pressed against the inner surface of the door 9, with the door 9 closed, whereby the grip main body 2 is stabilized. In addition, the grip main body 2 does not need to contact the grip fixing base 3 and the intermediate rotating body 14 in the state where the curved face 5A of the grip main body 2 is pressed against the inside surface of the door 9, with the door 9 closed.

Also, a contacting surface 19A to be contacted by the outside stepped portion 19 is provided at the other side of the extending part 21 on the proximal side of the grip main body 2. The grip main body 2 takes its usage position Y when the contacting surface 19A is contacted by the outside stepped portion 19. Furthermore, when a load is applied to the grip main body 2 in the usage position Y, the grip main body 2 is rotatable down to the lower limit position Z, against the restoring force of the coil spring 20. In this case, the contacting surface 19A is contacted by the outside stepped portion 19, so that the intermediate rotating body 14 with a braking force applied thereto by the braking gear 17 is rotated, and thus, the grip main body 2 is allowed to be rotated slowly. Thus, even if a user puts one's hand on the grip main body 2 and shifts one's weight onto one's hand, since the repulsion of compression of the coil spring 20 prevents the grip main body from falling suddenly, and hence, a user does not lose balance. Also, when a user shifts one's weight onto the grip main body 2, the grip main body 2 rotates to the downside from the usage position Y, so that a buffering effect can be obtained and the availability of the assist grip 1 is improved. It should be noted that a restoring force of the coil spring 20 increases as the grip main body 2 falls or is lowered. Due to the grip main body 2 contacting the contacting surface 24 of the lower limit position provided in the upper part 3B of the grip fixing base 3, rotation of the grip main body 2 from the lower limit position Z toward the downside is limited.

Figure 6:
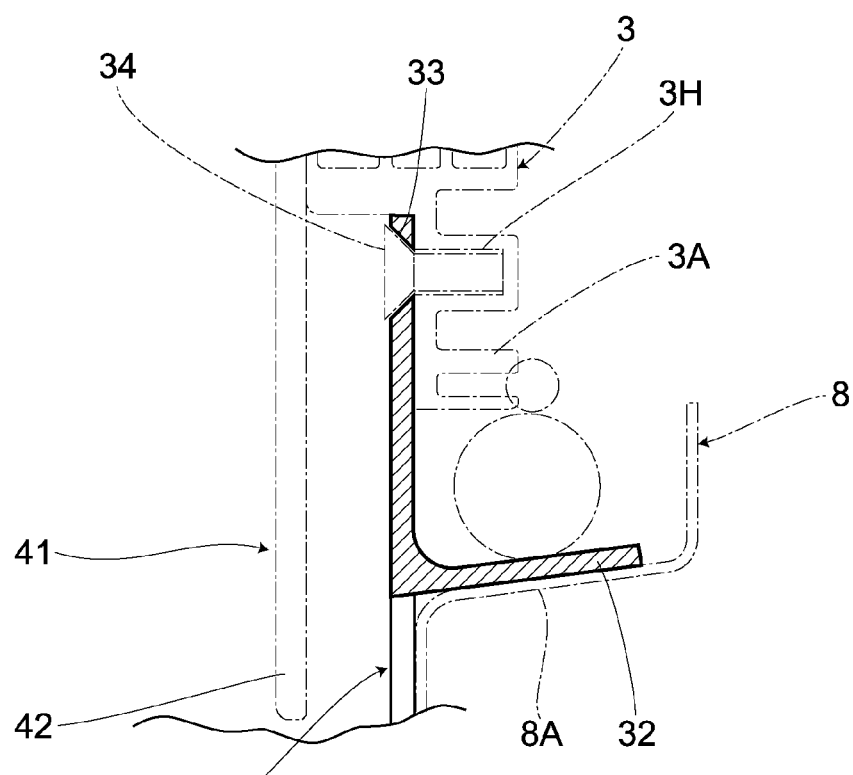
FIG. 6 is a sectional view illustrating an attached state of the grip fixing base according to the first embodiment of the present invention.
Figure 7:
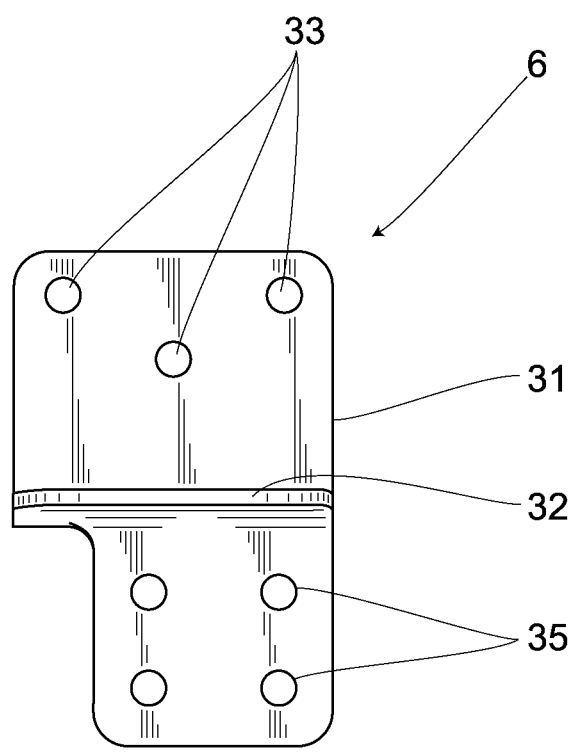
FIG. 7 is a front view of a bracket according to the first embodiment of the present invention.

FIG. 6 shows the bracket 6 in an attached state. In this figure, left-hand side indicates inside of the vehicle, while right-hand side shows the door 9 side. As shown in FIGS. 6 and 7, the bracket 6 is integrally provided with a main body 31 which has a plate shape as viewed in the lengthwise direction, and a grounding part 32 projected from the center of the main body 31 in a transverse direction. The grounding part 32 is provided obliquely so that the distal side thereof is slightly higher than the proximal side adjacent to the main body 31. Through-holes 33 are bored in the upper part of the main body 31 corresponding to the aforesaid attachment holes 3H, and a flat-head screw 34 is allowed to penetrate through each through-hole 33, and then the flat-head screw 34 is screwed into each hole 3H. As a result, the grip fixing base 3 is fixed to the bracket 6. A plurality of through-holes 35 are bored in the lower part of the bracket 6. As shown in FIG. 6. the grounding part 32 is placed on the stepped part 8A of the side sill 8. The flat-head screw 34 is allowed to penetrate through each through-hole 38 below the stepped part 8A and is screwed into the side sill 8, whereby the grip fixing base 3 is fixed to the side sill 8 through the bracket 6.

Figure 8A:
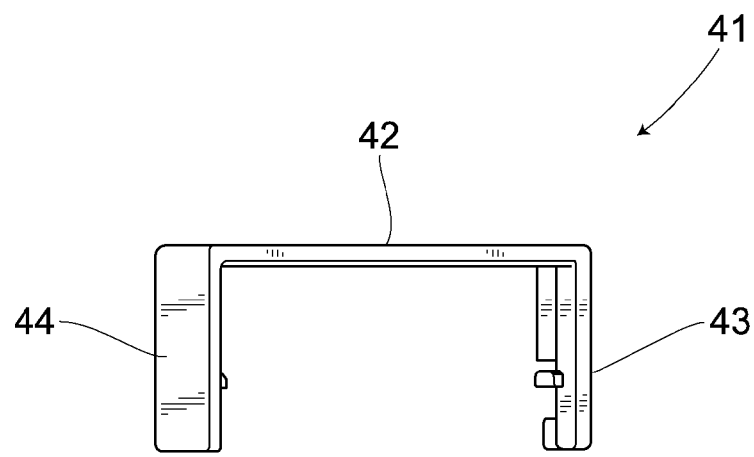
FIG. 8A is a plan view of a cover according to the first embodiment of the present invention.
Figure 8B:
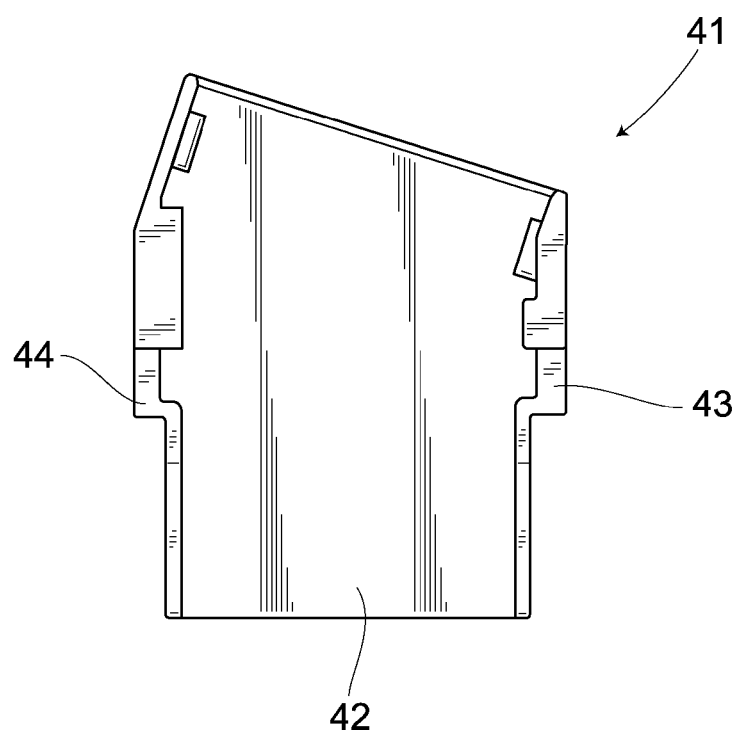
FIG. 8B is a side view of the cover seen from outside of a vehicle according to the first embodiment of the present invention.

Also, as shown in FIG. 6, the vehicular inside of the grip fixing base 3 is covered with a cover 41. As shown in FIGS. 8A and 8B, the cover 41 includes a main body 42 formed to be bent as is done so the grip fixing base 3, and a front wall part 43 and a back wall part 44 which are provided at a front and back sides of the main body 42. Particularly as shown in FIG. 8A, the cover 41 has a substantially U-shape in its cross section, and the grip fixing base 3 is stored between the front wall part 43 and the back wall part 44. Accordingly, by covering the grip fixing base 3 with the cover 41, the intermediate rotating body 14, the braking gear 17, etc. acting as the internal mechanism of the grip fixing base 3 are not exposed to the external, and thus, they are well protected.

Figure 9:
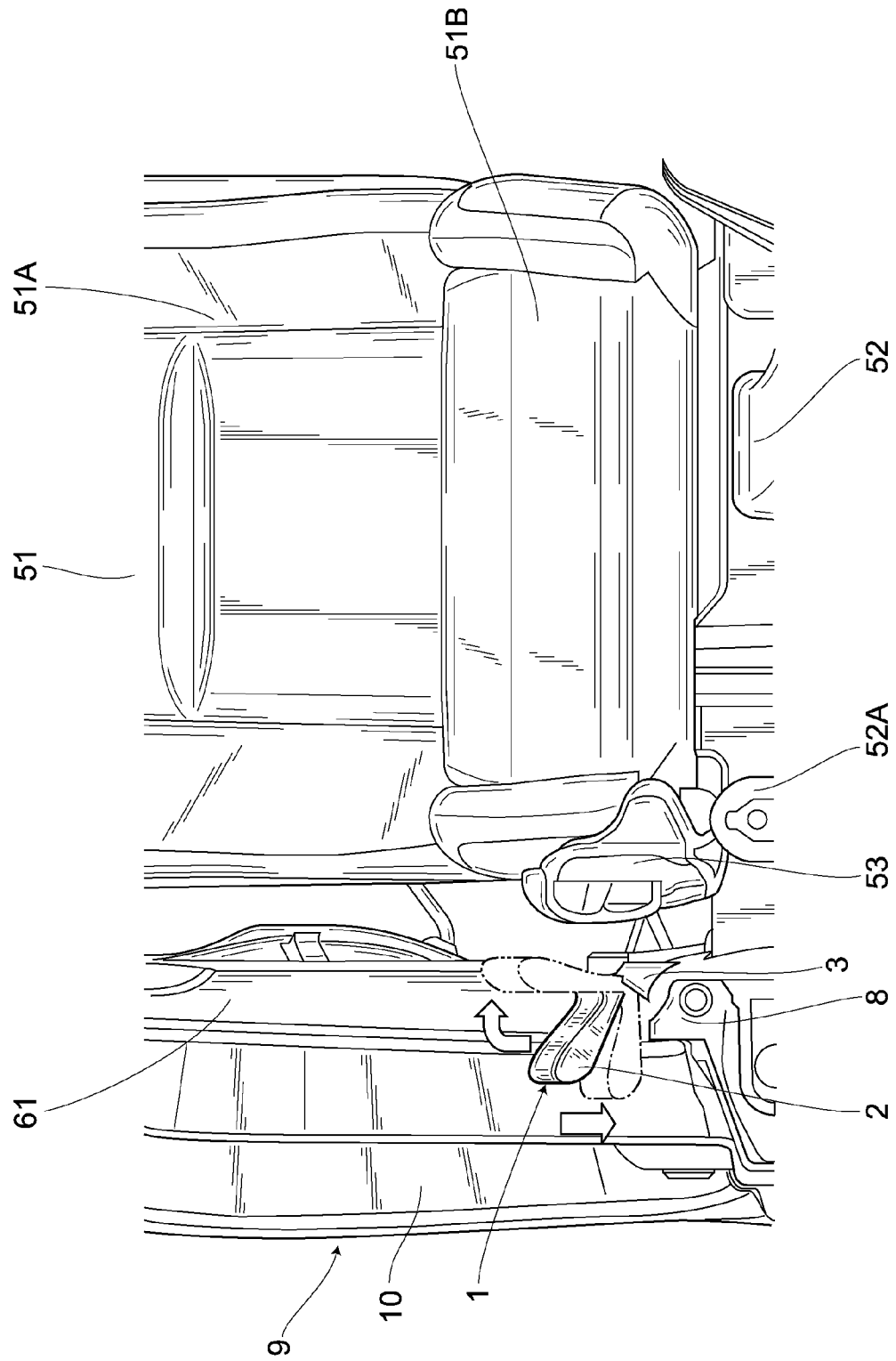
FIG. 9 is a perspective view seen from a front side of a vehicle, illustrating the attached state of the assist grip according to the first embodiment of the present invention.
Figure 10A:
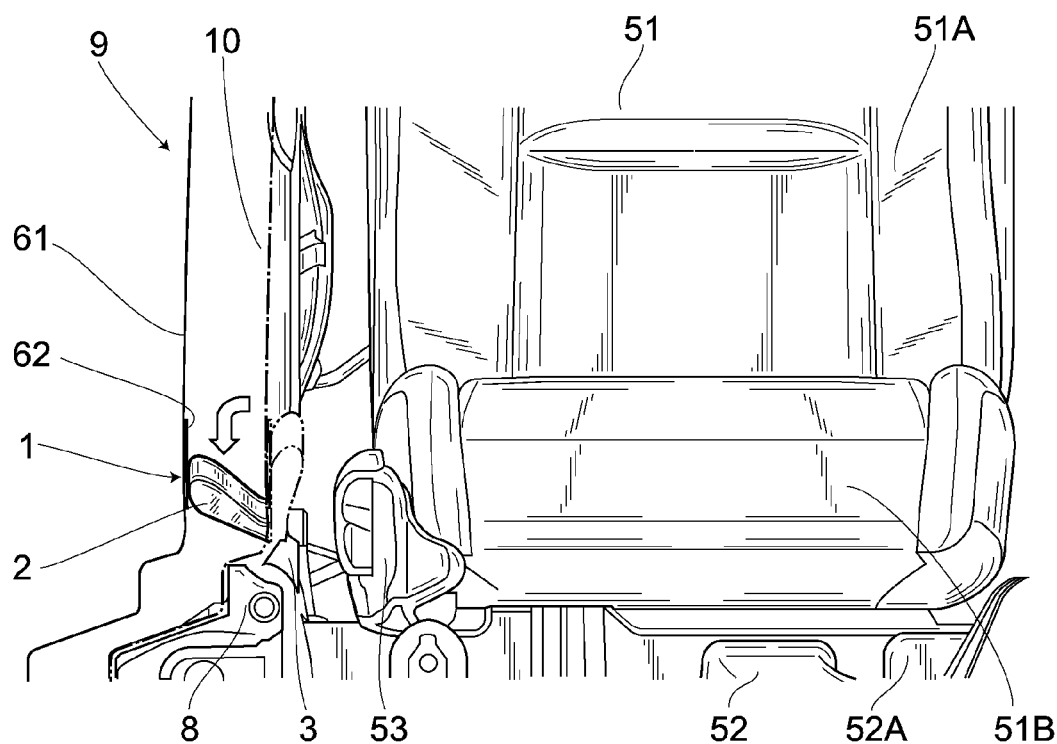
FIG. 10A is a perspective view of the attached assist grip, in which the grip main body is located in a usage position according to the first embodiment of the present invention.
Figure 10B:
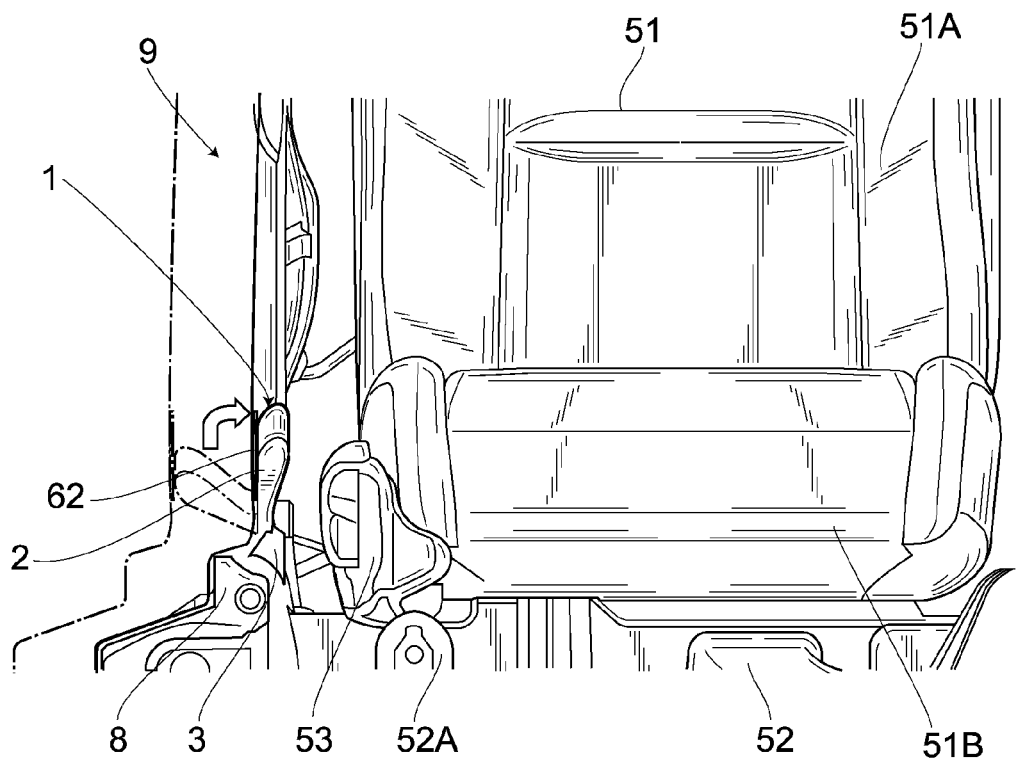
FIG. 10B is another perspective view of the attached assist grip, in which the grip main body is located in a storage position according to the first embodiment of the present invention.
Figure 11:
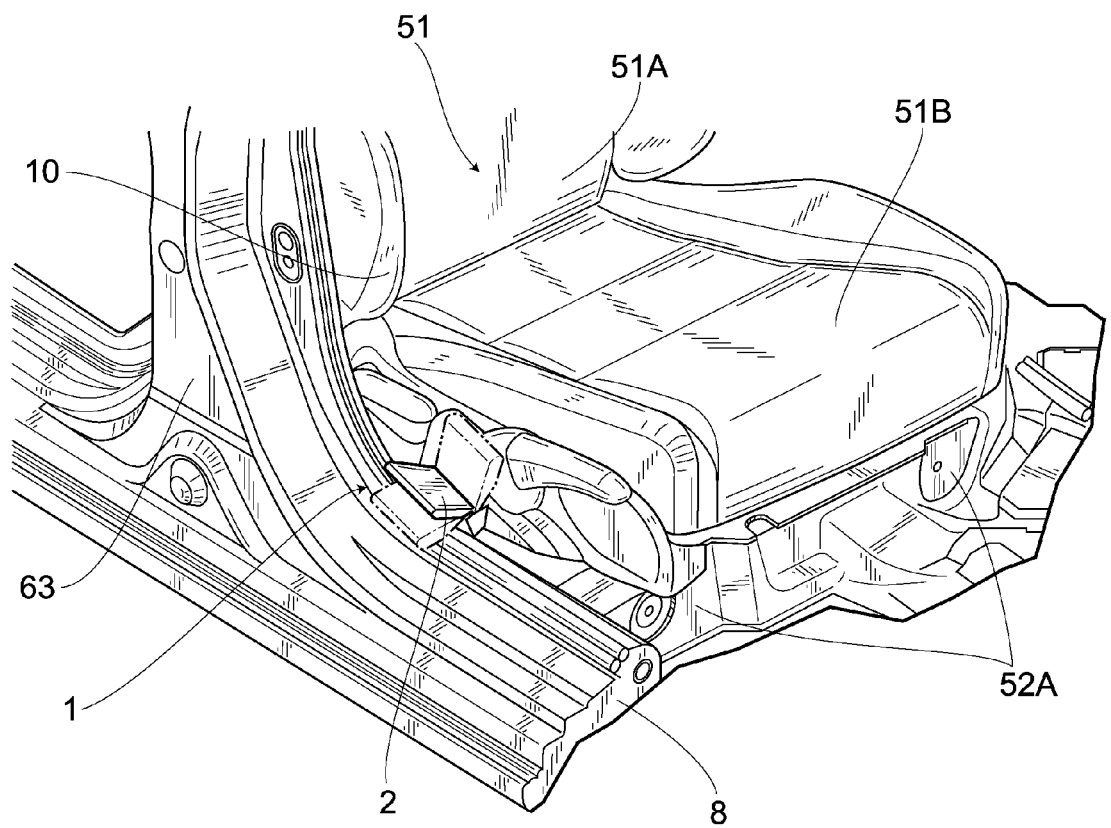
FIG. 11 is a perspective view of the attached assist grip seen from a front side of a vehicle, according to the first embodiment of the present invention.

As shown in FIGS. 9-11, a seat 51 is provided in the interior of the vehicle room. The seat 51 includes a seat back 51A and a seating face part 51B, and an electric-powered seat is adopted for allowing the seat to slide in a front-back direction by a motor drive. An electric-powered seat unit 52 and a seat rail 52A to slide the seat 51 as components of the electric-powered seat are provided on the indoor floor. An operating portion 53 for operating the electric-powered seat is provided at the side of the seating face part 51B so that the seat can be operated to slide in a front-back direction by operation of the operating portion 53. Preferably, the assist grip 1 is attached to an appropriate position in the side sill 8 that extends from a floor panel constituting a vehicle frame and forms a portion below the door opening 10. According to this embodiment, the grip main body 2 is attached to the side sill 8 so that the grip main body 2 may be located on the side of the seating face part 51B of the seat 51 over an entire range of the adjustable position of the seat 51, and, in this embodiment, the assist grip 1 is provided at the side of the driver's seat in a right-hand drive vehicle.

Moreover, a protective sheet material 62 is provided in the position where the grip main body 2 abuts in the inner panel 61 of the door 9 through adhesion etc., and the protective sheet material 62 is provided at the backside of the door 9. Since the grip main body 2 abuts the protective sheet material 62 when opening or closing the door 9, the external surface of the inner panel 61 is protected. The protective sheet material 62 has a coefficient of friction smaller than the inner panel 61. In the meantime, a reference number 63 shows a center pillar of the vehicle in FIG. 11.

Next, how to use the assist grip 1 is described hereinbelow. As shown in FIG. 10A, when the door 9 is opened, the grip main body 2 rotates down to the usage position Y by the force of the coil spring 20A, and projects toward the outside of the vehicle so that a large upper surface of the grip main body 2 appears. A user sitting on the seat 51 grips the grip main body 2 in such a way as to grasp from above. At this moment, the user can grasp the grip main body 2 with one's finger caught in the curved face 5A positioned at the lower side. Accordingly, the user can shift one's weight to the grip main body 2 with the palm of one's hand so that the user can stand up from the seat 51. In this case, since the grip main body 2 is lowered slowly due to the braking force of the coil spring 20 and the braking gear 17, the user can safely and easily shift one's weight in a well-balanced manner Moreover, since the grip main body 2 is inclined forward at the angle θ of inclination from a vertical direction, it is easy to use the grip main body 2 as an assisting tool in standing up from the seat 51 obliquely forward. On the other hand, when the hand is released, the grip main body 2 returns to the usage position Y due to the elastic restoring force of the coil spring 20. When the door 9 is shut, the protective sheet material 62 provided in the inside of the door 9 abuts to the curved face 2A of the grip main body 2, then the grip main body 2 rotates toward the storage position X, against the restoring force of the coil spring 20A. Then, in the neighborhood of the storage position X, the curved face 5A is allowed to slide on the protective sheet material 62, and when the door 9 is completely shut, the grip main body 2 is brought into the storage position X. As shown in FIG. 12, the door 9 is opened and closed about the hinge 9A in this embodiment, and since the inner surface of the door 9 hits the convexly curved surface 2K, the grip main body 2 rotates smoothly. And in the storage position at which the door 9 is closed, since the grip main body 2 is pressed against the protective sheet material 62 of the door 9 by the elastic restoring force of the coil spring 20A, and hence the inner panel 61 can be protected, and the grip main body 2 can be firmly stored without shakiness or slips between components. In this case, shakiness etc. can be further prevented by using an elastic sheet as the protective sheet material 62.

As mentioned above, according to the assist grip of the present embodiment, there is provided the assist grip for vehicle capable of improving the flexibility of the posture change at the time of getting out of the occupant's seat, eliminating the need for the occupant's preliminary operation and adjustment at the time of usage, improving convenience such that the occupant can apply a force thereon and get out of the vehicle comfortably, with the angle easy to grip the grip main body.

As described above, with respect to the first aspect in the present embodiment, the assist grip 1 for vehicle of the invention includes the grip main body 2 for supporting the occupant getting out of the seat 51, the grip main body 2 being provided in the lower part of the door opening 10 beside the seat 51, where the grip main body 2 is provided in a manner capable of being raised and lowered in the outward direction of the vehicle. Accordingly, since the grip main body 2 is allowed to fall outward of the vehicle at the time of use of the assist grip 1, a gripping portion to which the occupant can put his/her hand becomes larger, while the occupant can enjoy an increased flexibility in changing his/her posture, thus making it easier for the occupant to get out of the vehicle.

With respect to the second aspect in the present embodiment, the grip main body 2 is allowed to turn into either a projected state or a stored state according to opening or closing operation of the door 9 of the vehicle. Accordingly, convenience in using the grip main body 2 is improved. Moreover, since the position and direction of the end of the grip main body are determined by opening or closing the door, the occupant can save the trouble of doing troublesome operations, such as storing operation, raising operation, and position adjustment of the grip main body.

With respect to the third aspect in the present embodiment, the position of the seat 51 is adjustable in a front-back direction, and the grip main body is located in the side part of the seating portion 51B of the seat 51 over an entire range of the position adjustment of the seat. Accordingly, the grip main body 2 is located in the side part of the seat 51 regardless of which position the seat 51 is located in, whereby the occupant can safely and reliably grip the grip main body 2 in any seating position. As a result, operability and convenience of the assist grip 2 is improved.

Moreover, since the grip main body 2 is inclined toward the front of the vehicle at the angle θ of inclination from the vertical direction, the grip main body 2 is allowed to have the angle for the occupant to easily grip the same at the time of getting out of the vehicle. Moreover, since the assist grip 1 includes the coil spring 20A which rotationally biases the grip main body 2 toward the usage position Y from the storage position X, the grip main body 2 is allowed to rotate toward the usage position Y automatically when the door 9 is opened. Moreover, since the grip main body 2 includes the upheaval part 5 on the surface that becomes the under surface when in the usage position Y, said upheaval part 5 including the convexly curved surface 5A to engage with the inside surface of the door 9 near the storage position. Accordingly, when the occupant grips the grip main body 2, the curved surface 5A becomes less slippery and catches the occupant's finger easily therein. Further, since the curved surface 5A slides on the inner surface of the door 9 at the time of closing, rotation of the grip main body 2 can be performed smoothly. Furthermore, since the tip edges of the grip main body 2 are formed in the curved face 2K, 2K, respectively, rotation of the grip main body 2 is smoothly performed according to opening or closing operation of the door 9 of a hinge type. Moreover, since a restoring force of the coil spring 20A to rotate upward increases as the grip main body 2 is lowered according to the foregoing mechanism for raising and lowering the grip main body 2, even if the occupant applies one's weight to the grip main body 2 in the usage position Y, the grip main body 2 does not fall suddenly, and can stably support one's weight. Still further, since the upper part of the grip fixing base 3 includes the braking gear 17 which regulates to brake rotation of the intermediate rotating body 14, the grip main body 2 can be rotated smoothly to the lower limit position Z from the usage position Y. Moreover, since the bracket 6 includes the grounding part 32 to be placed on the stepped part 8A serving as the receiving portion of the side sill 8, the load added to the assist grip 1 can be supported by the grounding part 32. Furthermore, due to the cover 41, the intermediate rotating body 14, the braking gear 17, and etc. which are the internal mechanisms of the grip fixing base 3, are protected without being exposed to the external. Moreover, since the protective sheet material 62 is formed in the position where the grip main body 2 abuts, the inner panel 61 etc. of the door 9 are protected, and the movement of raising and lowering of the grip main body 2 can be smoothly performed.

Second Embodiment

Figure 13:
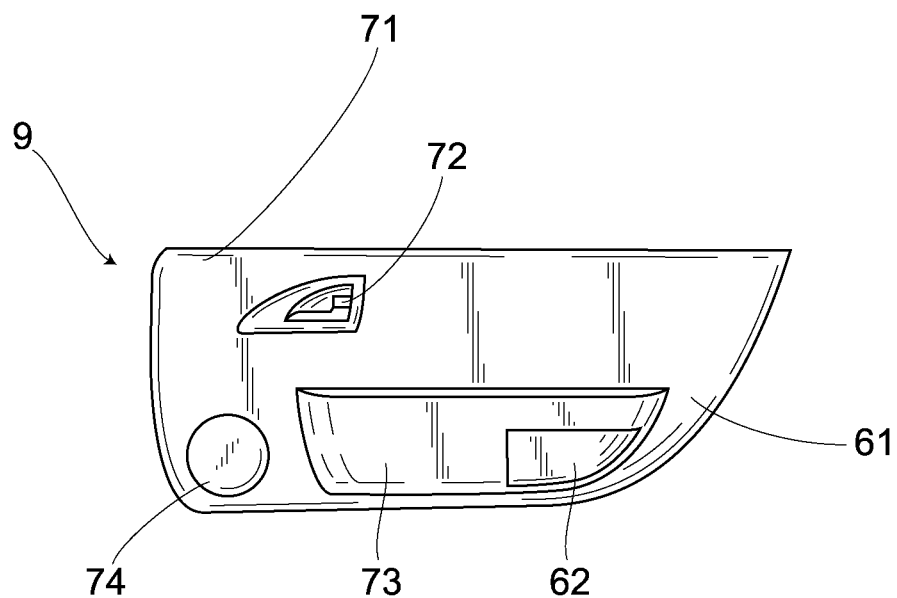
FIG. 13 is a front view of an inner surface of the door according to a second embodiment of the present invention.

FIG. 13 shows a second embodiment of the invention, and a description thereof is given with the same reference numbers attached to the same portions as in the first embodiment, and the same descriptions as in the first embodiment omitted. FIG. 13 shows an inner surface of the door 9. An upper cover part 71 is formed in the upper part in the inner panel 61 of the door 9, while a door lock unit 72 is formed in the lower part of the upper cover part 71. Below this unit, there are provided a speaker 74 and a horizontally-elongated door pocket 73 arranged at front and rear sides, respectively. The door pocket 73 is formed so as to be expanded toward the inside relative to the inner panel 61 around the same. In the rear part of the door pocket 73, there are provided the protective sheet material 62 attached by adhesion or the like to the position where the grip main body is to abut. Since the grip main body 2 abuts the protective sheet material 62 when opening or closing the door 9, the external surface of the door pocket 73 is protected.

Thus, this embodiment can achieve the same function and effect as those achieved by the first embodiment of the invention.

According to this embodiment, since the grip main body 2 is contacted by the door pocket 73 that is an expanded or projected portion of the inner surface of the door 9, a space is ensured between the inner surface of the door 9 and the seat 51 except that of the door pocket 73.

In the meantime, this invention is not limited to the foregoing embodiments, and various modifications are possible within the range of the gist of the invention. For example, in the foregoing embodiments, there are provided the coil spring acting as the rotation biasing unit for rotationally biasing the grip main body toward the usage position, according to the opening movement of the door. In contrast, if the grip main body is designed to be inclined toward the outside in the storage position, the rotational biasing unit may not be necessary, or otherwise, may be used in combination with the rotation of its own weight, since when the door is opened, the grip main body rotates toward the usage position by its own weight. Alternatively, the door and the grip main body are not necessarily to be contacted by each other. Instead, a sensor which detects opening or closing of the door may be provided, and rotation of the grip main body may be electrically driven, using a stepping motor etc. so that a control means may control the rotation of the grip main body by the output of the sensor. In this case also, it is preferable that the intermediate rotating body, the coil spring 20, and the braking gear are provided. In addition, the assist grip may contact the inside of the door in the case of using such electrically-driven type rotating system as well. Furthermore, the connecting shaft acting as the axis of the rotation of the grip main body may be arranged horizontally. Moreover, the seat is not limited to the electromotive type, but may be manually operated one that enables position adjustment through manual operation. Needless to say that the assist grip may be provided at the side of a front occupant seat and/or both sides of a rear occupant seat. Although the assist grip of the invention is applied to a hinge type door in the foregoing embodiments, it may be also applied to a slide type door. In this case, an elongated projection may be provided on the door inside surface in the length direction thereof so that the grip main body may contact the same to be rotated toward the storage position or the usage position in association with the opening or closing movement of the door. In addition, it is preferable that the protective sheet material is elongated in the front-back direction so that the grip main body may abut thereto over an an entire range of position adjustment of the seat.

What is claimed is:

1. An assist grip for a vehicle, comprising;
   a grip main body for supporting an occupant getting out of a seat in the vehicle, said grip main body being provided in a lower part of a door opening beside the seat, in a manner capable of being raised and lowered in the outward direction of the vehicle,
   wherein said grip main body automatically moves to a projected state when the door of the vehicle is opened, and automatically moves to a stored state when the door of the vehicle is closed, and
   wherein said grip body is located in a side part of a seating portion of the seat.

2. The assist grip for a vehicle according to claim 1, wherein a position of said seat is adjustable in a front-back direction, said grip main body being located in a side part of a seating portion of the seat over an entire range of the adjustable position of the seat.

3. The assist grip for a vehicle according to claim 1, wherein said grip main body is inclined toward a front side of the vehicle, from a vertical direction.

4. The assist grip for a vehicle according to claim 1, wherein said grip main body is provided rotatably within a range from a storage position that is a substantially vertical position to a lower limit position that is a substantially horizontal position, through a usage position where a distal side of said grip main body is slightly higher than a proximal side thereof.

5. The assist grip for a vehicle according to claim 4, further comprising a rotation biasing unit for rotationally biasing said grip main body toward said usage position from said storage position.

6. The assist grip for a vehicle according to claim 1, wherein said grip main body engages with an inside surface of the door and rotates in contact with the inside surface of the door when opening and closing the door.

7. The assist grip for a vehicle according to claim 6, further comprising a protective sheet material provided on the inside surface of the door, in a position where said grip main body abuts.

8. An assist grip for a vehicle, comprising:
   a grip main body for supporting an occupant getting out of a seat in the vehicle, said grip main body being provided in a lower part of a door opening beside the seat in a manner capable of being raised and lowered in the outward direction of the vehicle,
   wherein a position of said seat is adjustable in a front-back direction, said grip main body being located in a side part of a seating portion of the seat over an entire range of the adjustable position of the seat.

9. The assist grip for a vehicle according to claim 8, wherein said grip main body is inclined toward a front side of the vehicle, from a vertical direction.

10. The assist grip for a vehicle according to claim 8, wherein said grip main body is provided rotatably within a range from a storage position that is a substantially vertical position to a lower limit position that is a substantially horizontal position, through a usage position where a distal side of said grip main body is slightly higher than a proximal side thereof.

11. The assist grip for a vehicle according to claim 10, further comprising a rotation biasing unit for rotationally biasing said grip main body toward said usage position from said storage position.

12. The assist grip for a vehicle according to claim 11, wherein said grip main body engages with an inside surface of the door and rotates in contact with the inside surface of the door when opening and closing the door.

13. The assist grip for a vehicle according to claim 10, wherein said grip main body engages with an inside surface of the door and rotates in contact with the inside surface of the door when opening and closing the door.

14. The assist grip for a vehicle according to claim 13, further comprising a protective sheet material provided on the inside surface of the door, in a position where said grip main body abuts.

15. An assist grip for a vehicle, comprising:
   a grip main body for supporting an occupant getting out of a seat in the vehicle, said grip main body being provided in a lower part of a door opening beside the seat, in a manner capable of being raised and lowered in an outward direction of the vehicle, said grip main body automatically moving to a projected state when the door of the vehicle is opened, and automatically moving to a stored state when the door of the vehicle is closed;
   a first rotation biasing unit for rotationally biasing said grip main body toward a usage position where a distal side of said grip main body is slightly higher than a proximal side thereof, from a storage position that is a substantially vertical position; and
   a second rotation biasing unit for rotationally biasing said grip main body toward said usage position from a lower limit position that is a substantially horizontal position,
   wherein said grip main body is provided rotatably within a range from said storage position to said lower limit position through said usage position, and is configured to be rotated toward said usage position from said storage position by said first rotation biasing unit when the door of the vehicle is opened, and is configured to be returned to said storage position from said usage position by being pressed by an inside surface of the door when the door of the vehicle is closed, and
   wherein said grip main body is further configured to be rotated down to said lower limit position against a restoring force of said second rotation biasing unit and supports an occupant's weight when the occupant grasps said grip main body in said usage position and applies a load thereto, and is configured to be returned to said usage position from said lower limit position when a hand is released.

16. The assist grip for a vehicle according to claim 15, further comprising:
   a grip fixing base attachable to the vehicle, said grip fixing base having a lower part and an upper part which is inclined relative to said lower part,
   wherein said grip main body is attached to said upper part of said grip fixing base with said first rotation biasing unit and said second rotation biasing unit disposed between said grip fixing base and said grip main body.

17. The assist grip for a vehicle according to claim 16,
   wherein an intermediate rotating body and a braking gear are disposed between said upper part of said grip fixing base and said grip main body, and
   wherein said grip main body includes an extending part which is engagable with said intermediate rotating body to limit movement of said grip main body in a rotational direction.

18. A vehicle, comprising:
   a door which is openable and closable in a door opening;
   a seat adjacent to said door; and
   an assist grip comprising
      a grip main body for supporting an occupant getting out of said seat in the vehicle, said grip main body being provided in a lower part of said door opening beside said seat, in a manner capable of being raised and lowered in an outward direction of the vehicle,
   wherein said grip main body automatically moves to a projected state when said door of the vehicle is opened, and automatically moves to a stored state when said door of the vehicle is closed, and
   wherein said grip main body is located in a side part of a seating portion of said seat.

19. The vehicle according to claim 18, wherein a position of said seat is adjustable in a front-back direction, said grip main body being located in the side part of the seating portion of said seat over an entire range of an adjustable position of said seat.

20. The vehicle according to claim 18, wherein said grip main body is inclined toward a front side of the vehicle, from a vertical direction.

* * * * *